United States Patent [19]
Okada

[11] Patent Number: 5,890,391
[45] Date of Patent: Apr. 6, 1999

[54] LINEAR DRIVE MECHANISM USING ELECTROMECHANICAL CONVERSION ELEMENT

[75] Inventor: Hiroyuki Okada, Izumi, Japan

[73] Assignee: Minolta Co., Ltd., Osaka, Japan

[21] Appl. No.: 779,259

[22] Filed: Jan. 3, 1997

[30] Foreign Application Priority Data

Jan. 4, 1996 [JP] Japan .................................. 8-014756

[51] Int. Cl.⁶ .................................................. H02N 2/04
[52] U.S. Cl. ........................ 74/128; 310/323; 310/328
[58] Field of Search ........................ 74/128; 310/316, 310/317, 323, 328

[56] References Cited

U.S. PATENT DOCUMENTS

| | | |
|---|---|---|
| 4,195,243 | 3/1980 | Thaxter . |
| 4,743,791 | 5/1988 | Kawai ..................................... 310/323 |
| 4,894,579 | 1/1990 | Higuchi et al. . |
| 4,927,299 | 5/1990 | Ramalingam et al. ................. 407/120 |
| 5,001,940 | 3/1991 | Ogawa ..................... 74/5.6 D |
| 5,101,278 | 3/1992 | Itsumi et al. ............................ 358/227 |
| 5,117,589 | 6/1992 | Bischoff et al. ...................... 51/216 A |
| 5,181,023 | 1/1993 | Fujii .................................... 340/825.46 |
| 5,198,935 | 3/1993 | Imanari et al. ......................... 359/698 |
| 5,225,941 | 7/1993 | Saito et al. . |
| 5,365,296 | 11/1994 | Murakami et al. .................. 354/195.1 |
| 5,587,846 | 12/1996 | Miyano et al. ......................... 359/824 |
| 5,589,723 | 12/1996 | Yoshida et al. ......................... 310/328 |
| 5,714,832 | 2/1998 | Shirrod et al. .......................... 310/328 |

FOREIGN PATENT DOCUMENTS 6123830   5/1994   Japan .

*Primary Examiner*—Richard M. Lorence
*Assistant Examiner*—David Fenstermacher
*Attorney, Agent, or Firm*—McDermott, Will & Emery

[57] ABSTRACT

A linear drive mechanism comprises an electromechanical conversion element for producing repeatable linear displacements in a predetermined direction, a working member fixedly connected to said electromechanical conversion element for simultaneous displacement therewith and having a guide surface formed in the direction of displacement of said electromechanical conversion element, a moving member frictionally contacting with the guide surface of said working member, and a pushing member furnished on said working member for pushing said moving member against said guide surface of the working member.

11 Claims, 4 Drawing Sheets

LINEAR DRIVE MECHANISM USING ELECTROMECHANICAL CONVERSION ELEMENT

BACKGROUND OF THE INVENTION

1. Field of the Invention

The present invention relates to a linear drive mechanism using an electromechanical conversion element for moving mechanical components of cameras and other precision machines.

2. Description of the Related Art

When a drive pulse comprising a moderately rising part followed by a sharply falling part is applied to a piezoelectric element, a displacement extending in the thickness direction of the piezoelectric element is gently generated by the moderately rising part of the drive pulse, and a sharp compression displacement is generated by the sharply falling part of the drive pulse. Linear drive mechanisms are known which use this characteristic to generate a linear movement of a movable member friction-bonded to a drive member by applying a drive pulse of the aforesaid waveform to a piezoelectric element and repeatedly discharging at different speeds to produce vibration in the piezoelectric element in the thickness direction at different speeds, thereby reciprocally moving at different speeds a drive member fixedly attached to said piezoelectric element (e.g., Japanese Laid-Open Patent Application No. 6-123830).

FIG. 4 shows an example of the construction of a photographic lens drive mechanism of a camera using the aforesaid type of linear drive mechanism. In FIG. 4, reference number 51 refers to a lens barrel at the left end of which is fixedly mounted a holding frame 52 of a first lens L1, and at the right end of which is formed a holding frame 51a of a third lens L3. A holding frame 53 of a second lens L2 is disposed within lens barrel 51 so as to be movable in the optical axis direction. Reference number 54 refers to a drive shaft for driving lens holding frame 53 in the optical axis direction, said drive shaft 54 being supported by a first flange 51b of lens barrel 51 and a flange 52b of lens holding frame 52 so as to be movable in the optical axis direction, and one surface of a piezoelectric element 55 is fixedly adhered to one end of said drive shaft 54.

Piezoelectric element 55 is displaced in the thickness direction, thereby displacing drive shaft 54 in the axial direction; one end of piezoelectric element 55 is fixedly adhered to drive shaft 54, and the other end of piezoelectric element 55 is fixedly adhered to the second flange 51c of lens barrel 51.

The lens holding frame 53 supporting the second lens L2 is provided with a contact member 53b as a movable member extending in a downward direction, and drive shaft 54 passes through said contact member 53b. A notch 53c is formed on the bottom surface of the contact member 53b. The contact member 53b and drive shaft 54 are friction-bonded by a suitable friction force via pressure contact of a pressure spring 53d inserted between the top surface of contact member 53b and the notch groove 53c. FIG. 5 shows the construction of the contact portion between drive shaft 54 and contact member 53b; the view is a section view along the X—X line of FIG. 4.

Another notch (not shown in FIG. 4) is formed at the top of lens holding frame 53, and engages a guide shaft 59 so as to prevent rotation of lens holding frame 53. Reference number 60 refers to a mount for attaching the lens to a camera.

The control operation is described hereinafter. When it is necessary to move lens L2 in the arrow a direction, a drive pulse having a waveform comprising a moderately rising part followed by a sharply falling part is applied to piezoelectric element 55, as shown in FIG. 6.

The piezoelectric element 55 generates a moderate displacement extending in the thickness direction, and displaces the drive shaft 54 in the axial direction indicated by arrow a.

Thus, lens holding frame 53 can be moved in the arrow a direction because pressure spring 53c presses against drive shaft 54 so as to produce a frictional bond with contact member 53b of lens holding frame 53 and causing movement in the arrow a direction.

The sharply falling part of the drive pulse generates a rapid compression displacement in the thickness direction of piezoelectric element 55, such that drive shaft 54 is also displaced in an opposite axial direction to the direction of arrow a. At this time, lens holding frame 53 does not move because the contact member 53b of lens holding frame 53 pressed against drive shaft 54 by pressure spring 53c substantially stays at said position due to the inertial force produced by the friction force between said contact member 53b and drive shaft 54.

In this case "substantially" pertains to movement in the arrow a direction and the opposite direction producing a follow-up movement of slipping of the frictional bonded surfaces between drive shaft 54 and the contact member 53b of lens holding frame 53, and includes an overall movement in the arrow a direction caused by the difference in drive times.

The lens holding frame 53 can be consecutively moved in the arrow a direction by applying consecutive drive pulses of the aforesaid waveform to piezoelectric element 55.

When moving the lens holding frame 53 in the opposite direction to the arrow a direction, such movement can be accomplished by applying to piezoelectric element 55 a drive pulse having a waveform comprising a sharply rising part followed by a moderately falling part.

In the aforesaid construction, drive shaft 54 is displaced in a relatively narrow range following the telescopic displacement produced in piezoelectric element 55, and contact member 53b which is in a state of friction contact with drive shaft 54 slides so as to follow in a predetermined direction. When drive shaft 54 is relatively long, however, i.e., when the length of the drive shaft is such that there is a long distance from the end of the drive shaft in contact with the piezoelectric member to the part friction-bonded to the contact member, the drive shaft is not displaced in following the telescopic displacement of the piezoelectric element due to elastic deformation of the drive shaft, thereby producing a phenomenon wherein the contact member cannot move. Therefore, there are limitations on the length of the drive shaft which are inconvenient inasmuch as the driving range of the lens L2 cannot be increased.

The above described construction of a lens device is a generally used lens barrel construction wherein a first lens L1 and lens holding frame 52 shown in FIG. 4 are removable and lens L2 is fixed or capable of extension from the camera, but such a construction is disadvantageous when a linear drive mechanism is applied inasmuch as lens L2 can be retracted into the lens barrel but the drive shaft protrudes a constant length regardless of the position of lens L2, such that the length (thickness) of the fixed lens barrel including the drive shaft or the camera in the optical axis direction cannot be made more compact.

SUMMARY OF THE INVENTION

A main object of the present invention is to eliminate the previously described disadvantages by providing a linear drive mechanism capable of reliably transmitting the displacement of an electromechanical conversion element to a drive member without being affected by the elastic deformation characteristics of members comprised in the device.

Another object of the present invention is to provide a compact linear drive mechanism wherein the drive shaft does not protrude beyond the driven members.

These objects are attained by a linear drive mechanism comprising a frame, a drive shaft fixedly connected to a moving member, a working member friction-bonded to the drive shaft, an electromechanical conversion element provided between the frame and the working member, said electromechanical conversional element and said working member, and said electromechanical conversional element and said frame being fixedly connected each other, and drive pulse generating means for inducing telescopic displacement in said electromechanical conversion element such that the drive shaft and the moving member move in the axial direction.

These objects are attained by a linear drive mechanism comprising an electromechanical conversion element for producing repeatable linear displacements in a predetermined direction, a working member fixedly connected to said electromechanical conversion element for simultaneous displacement therewith and having a guide surface formed in the direction of displacement of said electromechanical conversion element, a moving member frictionally contacting with the guide surface of said working member, and a pushing member furnished on said working member for pushing said moving member against said guide surface of the working member.

These and other objects, advantages and features of the present invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

DETAILED DESCRIPTION OF THE PREFERRED EMBODIMENT

A preferred embodiment of the linear drive mechanism using an electromechanical conversion element of the present invention is described hereinafter with reference to the accompanying drawings.

Figure 1:
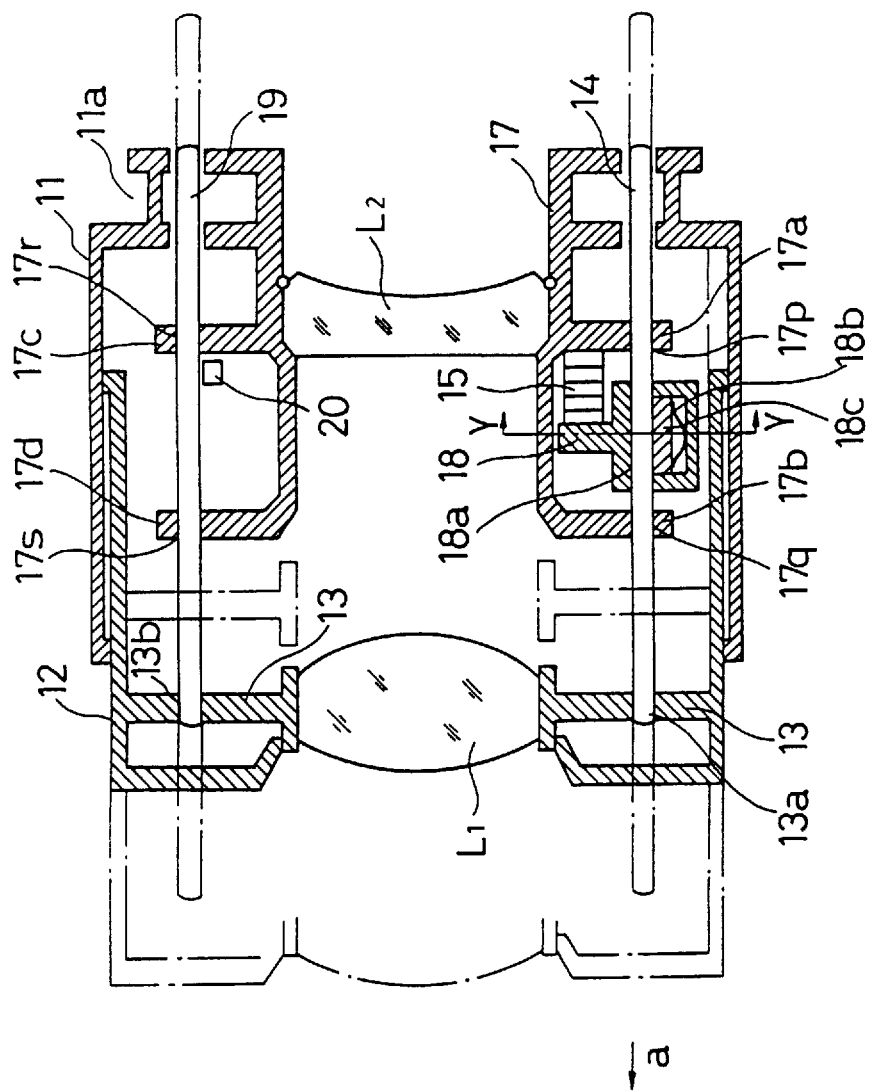
FIG. 1 is a section view showing the construction of a lens device adapting the linear drive mechanism using an electromechanical conversion element of the present invention.

FIG. 1 is a section view showing the construction of a lens device adapting the linear drive mechanism using an electromechanical conversion element of the present invention. In FIG. 1, reference number 11 refers to fixed lens barrel, reference number 12 refers to a movable lens barrel, reference number 13 refers to a lens holding frame for holding lens L1, reference number 17 refers to an internal barrel integratedly and fixedly attached to fixed lens barrel 11 and a part of which forms a lens holding frame for lens L2.

An extension 17a and extension 17b are formed in the radial direction on part of said internal barrel 17, such that drive shaft 14 arranged parallel to the optical axis is supported by bearings 17p and 17q of said extensions 17a and 17b so as to be movable in the optical axis direction. Extensions 17c and 17d are formed in the radial direction on part of internal barrel 17, such that guide shaft 19 arranged parallel to the optical axis is supported by bearings 17r and 17s of said extensions 17c and 17c so as to be movable in the optical axis direction.

Guide shaft 19 and lens holding frame 13 are fixedly connected at part 13b, and said guide shaft 19 and lens holding frame 13 move as an integrated unit when lens holding frame 13 is moved in the optical axis direction via a drive mechanism described later. Guide shaft 19 functions to prevent the rotation of lens holding frame 13 around the optical axis, and functions as a guide member for moving lens holding frame 13 in the optical axis direction with excellent precision.

A position sensor of a well-known ferromagnetic thin-film reluctance element type (hereinafter referred to as "MR sensor") is provided to detect the moving distance of the lens L1. That is, since the moving distance of lens L1 is also the moving distance of lens holding frame 13 and guide shaft 19, a magnetic reluctance element 20 comprising an MR sensor is arranged in internal barrel 17, and magnetic rods of north and south magnetic poles are arranged at predetermined intervals on guide shaft 19 so as to detect the moving distance of lens holding frame 13 in cooperation with said magnetic reluctance element 20.

Reference number 18 refers to a working member friction-bonded to drive shaft 14, and piezoelectric element 15 is disposed between said working member 18 and the extension 17a of internal barrel 17. The piezoelectric element 15 and working member 18, and piezoelectric element 15 and extension 17a of internal barrel 17 are fixedly bonded together with adhesive.

Figure 2:
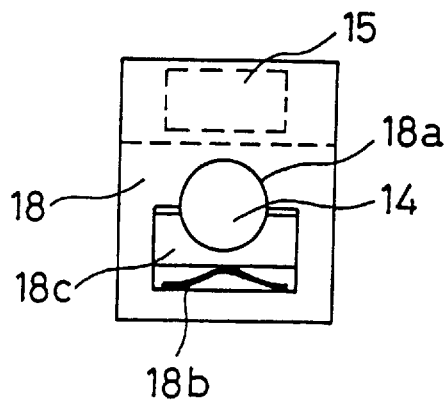
FIG. 2 is an enlarged section view of the contact area of the working member and drive shaft in the linear drive mechanism of FIG. 1.
Figure 4:
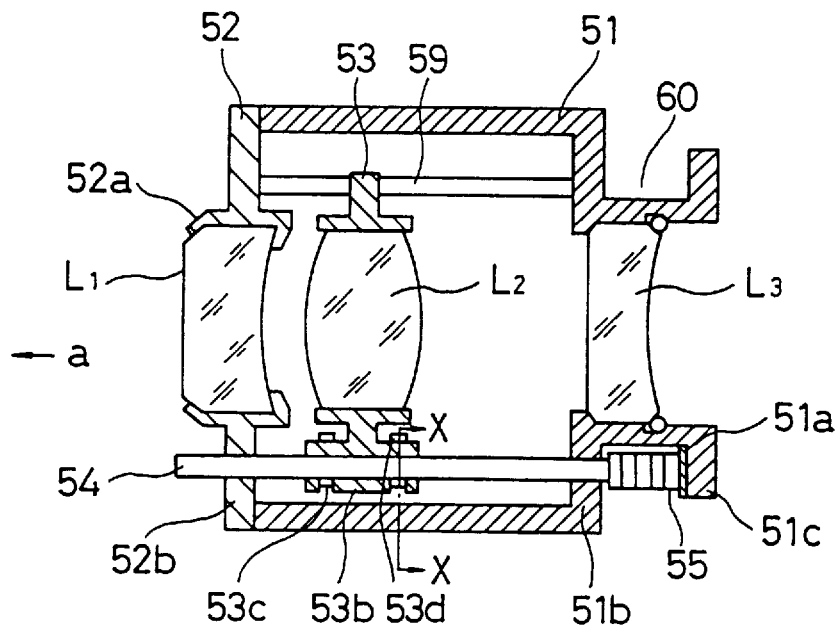
FIG. 4 is a section view showing the construction of a photographic lens drive mechanism using a conventional linear drive mechanism.
Figure 5:
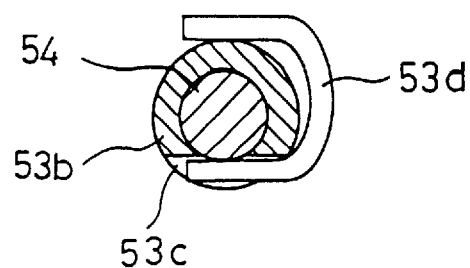
FIG. 5 is an enlarged section view of the contact area of the working member and drive shaft in the conventional linear drive mechanism.

A hole 18a is formed in working member 18 through which passes drive shaft 14. FIG. 2 shows an enlargement of the contact area between drive shaft 14 and working member 18 viewed in section along the Y—Y line of FIG. 1. In FIG. 2, the top half of working member 18 touches drive shaft 14, and a pad 18c is installed on the bottom half of working member 18 and exerts a force toward drive shaft 14 via a spring 18b, such that said pad 18c touches the bottom half of drive shaft 14. According to this construction, the working member 18 and pad 18c are friction-bonded to drive shaft 14 via a suitable friction force, said friction force being adjustable by modifying the elastic tension of spring 18b.

Drive shaft 14 and lens holding frame 13 are fixedly connected at part 13a, such that drive shaft 14 and lens holding frame 13 move as an integrated unit when drive shaft 14 moves in the axial direction. Since a movable lens barrel 12 is fixedly connected to lens holding frame 13, the drive shaft 14, lens holding frame 13 and movable lens barrel 12 move in the axial direction as an integrated unit.

Figure 3:
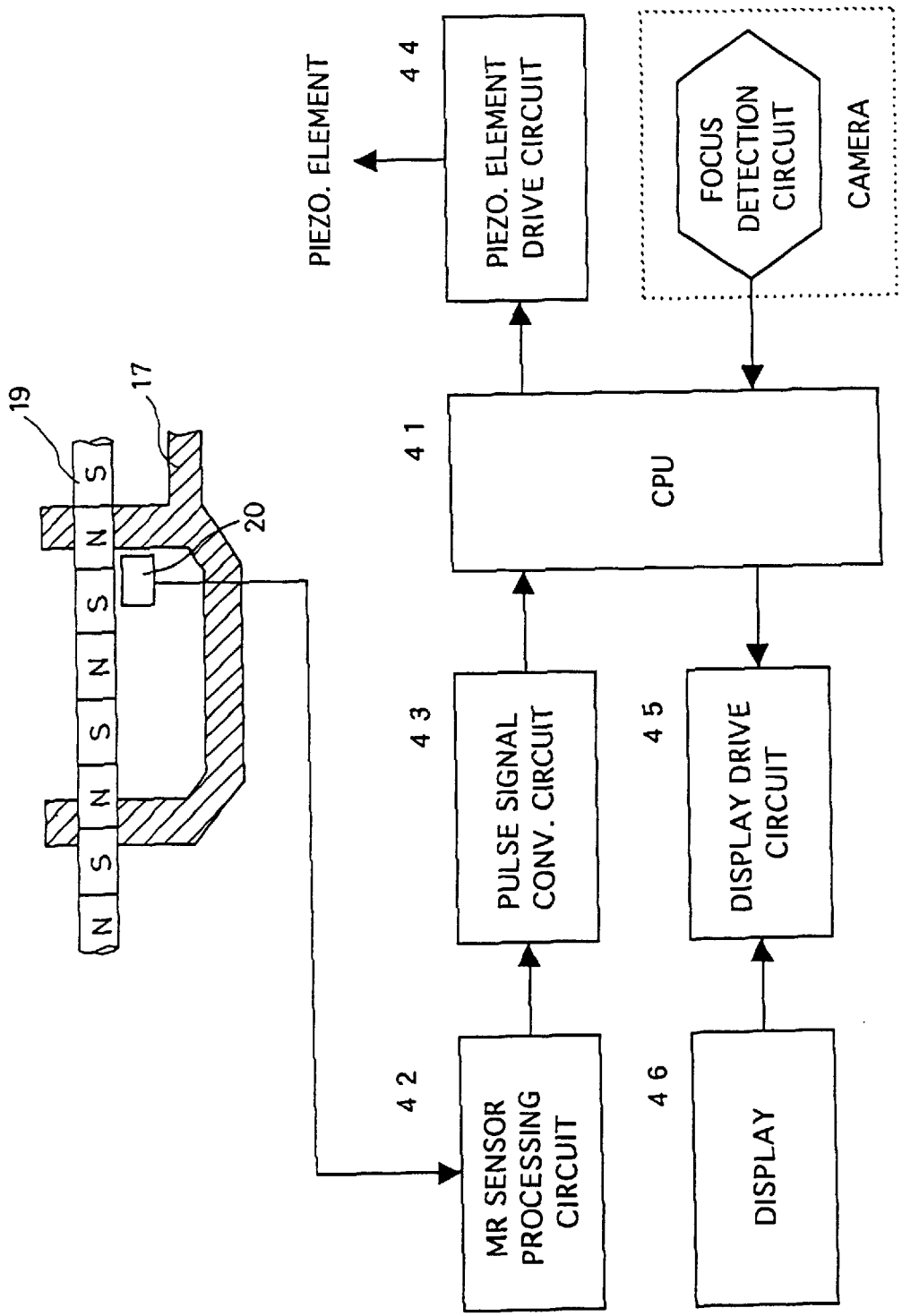
FIG. 3 is a block diagram of the control circuit for displaying the lens focus adjustment and object distance in the present embodiment.

FIG. 3 is a block diagram of the control circuit for displaying the lens focus adjustment and object distance. This control circuit comprises a central processing unit (CPU) 41, MR sensor output signal processing circuit 42 connected to CPU 41 via pulse signal conversion circuit 43 which is in turn connected to the output port of CPU 41, piezoelectric element drive circuit 44 connected to and output port, display drive circuit 45, and display 46.

Figure 6:
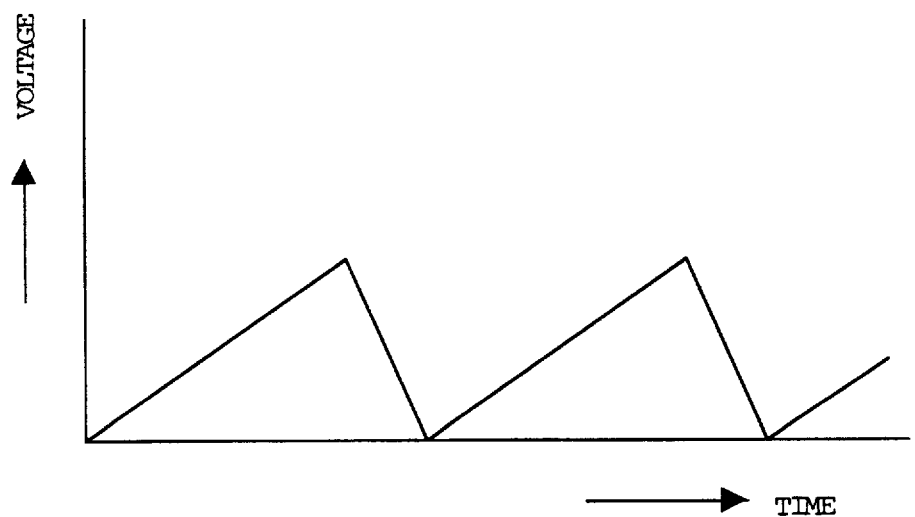
FIG. 6 illustrates an example of a drive pulse waveform applied to the piezoelectric element.

The control operation of the control circuit is described below. Focus detection information relating to an object is output from a focus detection circuit provided on the camera side and not shown in the drawings and input to CPU 41. CPU 41 examines the focus detection information, and when it is necessary to move the lens L1 in the arrow a direction, CPU 41 instructs piezoelectric element drive circuit 44 to output a drive pulse having a waveform comprising a moderately rising part followed by a sharply falling part as shown in FIG. 6, so as to drive piezoelectric element 15.

The moderately rising part of the drive pulse generates a moderate expansion displacement in the thickness direction of the piezoelectric element 15, which causes working member 18 to be displaced in the axial direction indicated by arrow a. Thus, lens holding frame 13 and movable lens barrel 12 are moved in the arrow a direction because the drive shaft 14 which is friction-bonded to working member 18 is moved in the arrow direction.

The sharply falling part of the drive pulse generates a rapid compression displacement in the thickness direction of the piezoelectric element 15 so as to displace the working member 18 in the opposite axial direction to the arrow a direction. At this time, the lens holding frame 13 and movable lens barrel 12 do not move because the drive shaft 14 friction-bonded to working member 18 substantially stays at said position due to the inertial force produced by the friction force between said drive shaft 14 and the contact member.

In this case "substantially" pertains to movement in the arrow a direction and the opposite direction producing a follow-up movement of slipping of the friction-bonded surfaces between drive shaft 14 and the working member 18, and includes an overall movement in the arrow a direction caused by the difference in drive times. The mode of movement in this case is determined in accordance with the friction conditions.

Lens holding frame 13 can be consecutively moved in the arrow a direction by applying consecutive drive pulses having the previously described waveform to the piezoelectric element 15.

When moving the lens holding frame 13 in the opposite direction to the arrow a direction, such movement can be accomplished by applying to piezoelectric element 15 a drive pulse having a waveform comprising a sharply rising part followed by a moderately falling part.

When the focus state is detected by a focus detection circuit on the camera side (not shown in the drawing), a detection signal is input to CPU 41, and CPU 41 issues a drive pulse output halt command to piezoelectric element drive circuit 44 to stop the drive pulse output to piezoelectric element 15, and thereby stop the movement of lens holding frame 13.

When lens holding frame 13 moves, the magnetic reluctance element 20 comprising an MR sensor mounted to the internal barrel 17 detects the magnetic poles of magnetic rods disposed at predetermined spacing on guide shaft 19. The detection signal is processed by an MR sensor output signal processing circuit 42, converted to pulse signals by pulse signal conversion circuit 43, and subsequently input to CPU 41. The CPU 41 determines the position of lens holding frame 13, i.e., lens position information, by counting the aforesaid pulse signals.

The lens position information is calculated and converted to object distance information which is displayed on display 46 via display drive circuit 45. The display 46 is a liquid crystal display device, although other well-known display devices may be used.

In the embodiment described above, drive shaft 14, lens L1, lens holding frame 13 and movable lens barrel 12 are members driven by friction contact with the working member 18. Thus, a sufficient inertial force required for the operation of the drive mechanism can be obtained despite the extremely light weight of the lens holding frame and the like due to the sufficient total mass of all members driven by the working member 18.

According to the preceding detailed description, the present invention provides that an expansion displacement and contraction displacement of different magnitudes generated in the thickness direction of an electromechanical conversion element are transmitted directly to a working member so as to displace a drive member friction-bonded to said working member in axial directions. Thus, the displacement of the electromechanical conversion element can be reliably transmitted to driven members via said drive member without being affected by the elastic deformation of said drive member.

Therefore, the present invention provides a linear drive mechanism using an electromechanical conversion element of excellent form factor wherein the drive member does not protrude in front of the driven members because the drive member is displaced in axial directions together with the driven members so as to feed out and in together with said driven members. When this device is applied to drive the photographic lens of a camera, for example, the camera and photographic lens can be made thinner to achieve an excellent form factor because the drive member, i.e., drive shaft, does not protrude in front of the photographic lens.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A linear drive mechanism comprising:
   a frame;
   a drive shaft fixedly connected to a moving member;
   a working member friction-bonded to the drive shaft; and
   an electromechanical conversion element provided between the frame and the working member, said electromechanical conversional element and said working member, and said electromechanical conversional element and said frame being fixedly connected each other.

2. A linear drive mechanism as claimed in claim 1, further comprising a pushing member furnished on said working member for pushing said drive shaft against said working member.

3. A Linear drive mechanism as claimed in claim 2, wherein said pushing member includes a pad touching said drive shaft and a spring for pressing said pad toward the drive shaft.

4. A linear drive mechanism as claimed in claim 1, further comprising drive pulse generating means for inducing telescope displacement in said electromechanical conversion element such that the drive shaft and the moving member move in the axial direction.

5. A linear drive mechanism as claimed in claim 4, wherein said drive pulse generating means outputs to said electromechanical conversion element a drive pulse having a waveform comprising a moderately rising part followed by a sharply falling part.

6. A linear drive mechanism comprising:

a frame:

an electromechanical conversion element fixedly connected to said frame for producing repeatable linear displacements in a predetermined direction;

a working member fixedly connected to said electromechanical conversion element for simultaneous displacement therewith and having a guide surface formed in the direction of displacement of said electromechanical conversion element, said guide surface having a first length in the direction; and a moving member frictionally contracting with the guide surface of said working member, said moving member having a contact area of second length in the direction, wherein said second length is longer than said first length.

7. A linear drive mechanism as claimed in claim 6, further comprising a pushing member furnished on said working member for pushing said moving member against said guide surface of the working member.

8. A linear drive mechanism as claimed in claim 7, wherein said moving member includes a driven member and a shaft fixedly connected on said driven member and said pushing member pushes the shaft against said guide surface of the working member.

9. A Linear drive mechanism as claimed in claim 8, wherein said working member has a hole through which passes the shaft.

10. A linear drive mechanism comprising:

an electromechanical conversion element for producing repeatable linear displacements in a predetermined direction;

a working member fixedly connected to said electromechanical conversion element for simultaneous displacement therewith and having a guide surface formed in the direction of displacement of said electromechanical conversion element;

a moving member fixedly connected to a moving element and having a shaft in surface-to-surface contact with the guide surface of said working member, said shaft having a length in said predetermined direction; and a pushing member furnished on said working member for pushing said shaft against said guide surface, the linear displacement of said electromechanical conversion element inducing linear displacement of the moving member and moving element as an integrated unit.

11. A Linear drive mechanism as claimed in claim 10, wherein said pushing member includes a pad touching said shaft and a spring for pressing said pad toward the drive shaft.

* * * * *